United States Patent
Dejanovic et al.

(10) Patent No.: US 11,652,698 B2
(45) Date of Patent: May 16, 2023

(54) VIRTUAL LAYER 1 (L1) CONNECTIVITY ACROSS A NETWORK

(71) Applicant: Arista Networks, Inc., Santa Clara, CA (US)

(72) Inventors: Thomas Dejanovic, Canterbury (AU); Callum Hunter, New South Wales (AU)

(73) Assignee: Arista Networks, Inc., Santa Clara, CA (US)

( * ) Notice: Subject to any disclaimer, the term of this patent is extended or adjusted under 35 U.S.C. 154(b) by 115 days.

(21) Appl. No.: 17/197,661

(22) Filed: Mar. 10, 2021

(65) Prior Publication Data
US 2022/0294703 A1  Sep. 15, 2022

(51) Int. Cl.
H04L 41/14 (2022.01)
(52) U.S. Cl.
CPC ............ *H04L 41/145* (2013.01); *H04L 41/14* (2013.01)
(58) Field of Classification Search
CPC .............................. H04L 41/14; H04L 41/145
See application file for complete search history.

(56) References Cited

U.S. PATENT DOCUMENTS

| | | | | |
|---|---|---|---|---|
| 2006/0215782 | A1* | 9/2006 | Ahmed | H04L 7/0012 375/272 |
| 2008/0225879 | A1* | 9/2008 | Powell | H04L 12/40136 370/445 |
| 2010/0098047 | A1* | 4/2010 | Zhou | H04W 28/0231 370/345 |
| 2020/0351943 | A1* | 11/2020 | Iyer | H04W 74/0816 |

\* cited by examiner

*Primary Examiner* — Gil H. Lee
(74) *Attorney, Agent, or Firm* — Tianyi He (57) ABSTRACT

A method and system for emulating physical layer (L1) connectivity between distant computing devices. Existing solutions require that the computing devices or end points directly connect to a same interconnecting (or network) device and/or employ network devices requiring awareness of the communication protocol used between the end points. Further, existing solutions typically fail to match the ingress and egress clock rates. These restrictions limit scaling of the solutions, confine the end points to a physical co-location, and/or fail to transport or replicate the physical properties (e.g., errors, proprietary signaling, clock frequency, etc.) of the data stream transmitted between the end points. The disclosed method and system overcome these limitations through implementation of a L1 connectivity abstraction between computing devices across a network, and through clock rate reconstruction using a data buffer state controlled phase lock loop (PLL) mechanism.

19 Claims, 7 Drawing Sheets

VIRTUAL LAYER 1 (L1) CONNECTIVITY ACROSS A NETWORK

BACKGROUND

Given some emerging scenarios, a scheme through which a virtual physical layer connectivity, over a network, and implemented between devices (or end points) that are not co-located yet operate under the presumption that they are, is greatly sought. Existing solutions, however, are characterized through restrictions that limit scaling of the solutions, confine the end points to a physical co-location, and/or fail to transport or replicate the physical properties (e.g., errors, proprietary signaling, clock frequency, etc.) of the data stream transmitted between the end points.

DETAILED DESCRIPTION

Specific embodiments of the disclosure will now be described with reference to the accompanying figures.

In general, embodiments of the disclosure described herein relate to a method and system for emulating physical layer (L1) connectivity between distant computing devices. Existing solutions require that the computing devices or end points directly connect to a same interconnecting (or network) device and/or employ network devices requiring awareness of the communication protocol used between the end points. Further, existing solutions typically fail to match the ingress and egress clock rates. These restrictions limit scaling of the solutions, confine the end points to a physical co-location, and/or fail to transport or replicate the physical properties (e.g., errors, proprietary signaling, clock frequency, etc.) of the data stream transmitted between the end points. The disclosed method and system overcome these limitations through implementation of a L1 connectivity abstraction between computing devices across a network, and through clock rate reconstruction using a data buffer state controlled phase lock loop (PLL) mechanism.

Figure 1:
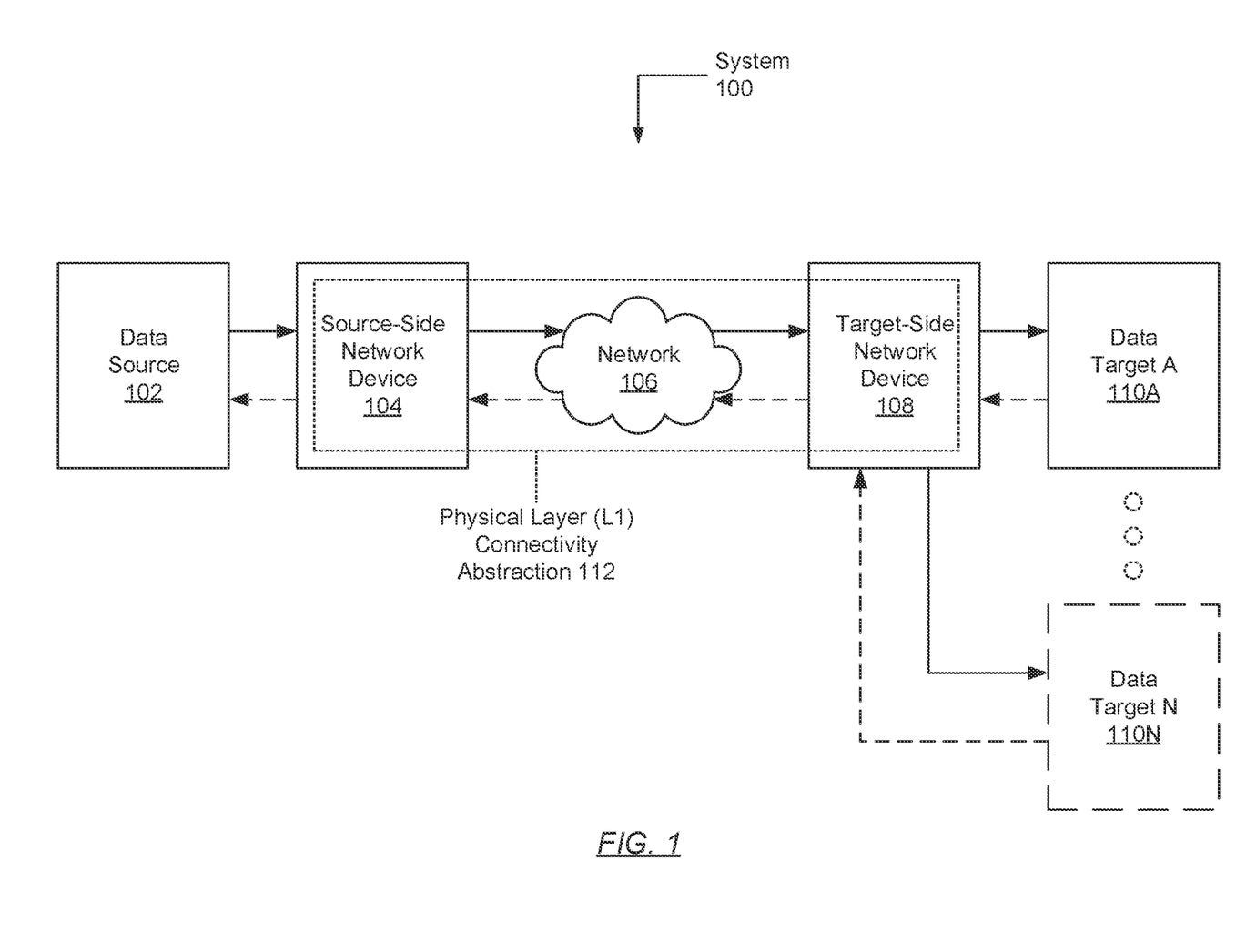
FIG. 1 shows a system in accordance with one or more embodiments of the disclosure.

FIG. 1 shows a system in accordance with one or more embodiments of the disclosure. The system (100) may include a data source (102), a source-side network device (104), a target-side network device (108), and one or more data targets (110A-110N). Specifically, the data source (102) may directly connect to the source-side network device (104), the source-side network device (104) may operatively connect to the target-side network device (108) through a network (106), and the target-side network device (108) may directly connect to the data target(s) (110A-110N). Each of these system (100) components is described below.

In one embodiment of the disclosure, the data source (102) may represent any physical computing device (or end point) (e.g., implemented through computer software, firmware, and hardware) that may be configured to generate, transmit, receive, and/or process data. The data source (102) may include functionality to communicate with—i.e., transmit data to (and/or receive data from)—the data target(s) (110A-110N) (described below). Though the data source (102) and the data target(s) (110A-110N) may be indirectly connected (via at least the source-side network device (104), the network (106), and the target-side network device (108)) based on one or more embodiments disclosed herein, the data source (102) may communicate with the data target(s) (110A-110N) with the presumption of a direct connection there-between. One of ordinary skill will appreciate that the data source (102) may perform other functionalities without departing from the scope of the disclosure.

Further, in one embodiment of the disclosure, the data source (102) may include, but is not limited to, one or more computer processors (e.g., integrated circuits), memory, persistent storage, and one or more physical network interfaces (also referred to as ports). Examples of the data source (102) may include, but are not limited to, a server, a desktop computer, a laptop computer, a tablet computer, a smartphone, network testing equipment, or any other type of computing device including the aforementioned minimum requirements.

In one embodiment of the disclosure, the source-side network device (104) may represent any physical computing device that facilitates networking interconnection and communication between co-located and/or remote (or physically distant) end points. The source-side network device (104) may include one or more computer processors (e.g., integrated circuits, a switch chip, or network processor), memory, persistent storage, and two or more physical network interfaces or ports. The aforementioned computer processor(s) may be programmed to determine out of which network interface on the source-side network device (104) to forward network traffic (e.g., protocol data units). To that end, the aforementioned computer processor(s) may include logical egress and ingress network interfaces that may connect to physical network interfaces on the source-side network device (104).

In one embodiment of the disclosure, the source-side network device (104) may, generally, include functionality to receive network traffic via the network interfaces, and determine whether to: (i) drop the network traffic; (ii) process the network traffic in accordance with one or more embodiments of the disclosure; and/or (iii) send the network traffic, based on the processing, out another network interface on the source-side network device (104) towards a destination. Concerning one or more embodiments disclosed herein, the source-side network device (104) may at least include functionality to perform the method outlined in FIG. 4, below, which may be directed to L1 connectivity emulation. One of ordinary skill, however, will appreciate that the source-side network (104) may perform other functionalities without departing from the scope of the invention.

In one embodiment of the disclosure, how the source-side network device (104) makes the above-mentioned determination to drop network traffic (e.g., protocol data units), and/or send network traffic to another system (100) component (e.g., data source (102) or network (106)), depends, at least in part, on whether the source-side network device (104) is a layer 2 (L2) switch or a layer 3 (L3) switch (also referred to as a multilayer switch)— the latter of which may perform at least some functions of a router. More specifically, if the source-side network device (104) operates as a L2 switch, the source-side network device (104) may use a destination media access control (MAC) address (specified within header information of network traffic) along with a forwarding table or policy to determine out of which network interface to send the network traffic. Alternatively, if the source-side network device (104) operates as a L3 switch, the source-side network device (104) may use a destination Internet Protocol (IP) address (specified within header information of network traffic) along with a routing table or policy to determine out of which network interface to send the network traffic. Further, if the source-side network device (104) operates as a multilayer switch, the source-side network device (104) may include functionality to process network traffic using both MAC addresses and IP addresses.

In one embodiment of the disclosure, the persistent storage on the source-side network device (104) may include any type of non-transitory computer readable medium that includes computer readable program code (or instructions), which when executed by at least one computer processor, enables the source-side network device (104) to perform any of the functionalities described herein. Moreover, examples of the source-side network device (104) may include, but are not limited to, a switch, a router, a multilayer switch, a fibre channel (FC) device, and an InfiniBand® device. The source-side network device (104) is not limited to the aforementioned specific examples. Further, the source-side network device (104) is described in further detail in FIG. 2, below.

In one embodiment of the disclosure, the network (106) may represent a collection of network-enabled devices (or systems) (e.g., switches, routers, gateways, etc.), which may be interconnected using any combination of wired and/or wireless connections. The network (106) (or any subset thereof) may include functionality to facilitate communications between at least the source-side network device (104) and the target-side network device (108), which may be spatially or geographically distant from one another. Further, in facilitating communications, the network (106) may employ any combination of wired and/or wireless communication protocols. Examples of the network (106) may include, but are not limited to, a local area network (LAN), a wide area network (WAN) such as the Internet, a mobile network, any other network type, or any combination thereof.

In one embodiment of the disclosure, the target-side network device (108) may represent any physical computing device that facilitates networking interconnection and communication between co-located and/or remote (or physically distant) end points. The target-side network device (108) may include one or more computer processors (e.g., integrated circuits) (including a switch chip or network processor), memory, persistent storage, and two or more physical network interfaces or ports. The aforementioned computer processor(s) may be programmed to determine out of which network interface on the target-side network device (108) to forward network traffic (e.g., protocol data units). To that end, the aforementioned computer processor(s) may include logical egress and ingress network interfaces that may connect to physical network interfaces on the target-side network device (108).

In one embodiment of the disclosure, the target-side network device (108) may, generally, include functionality to receive network traffic via the network interfaces, and determine whether to: (i) drop the network traffic; (ii) process the network traffic in accordance with one or more embodiments of the disclosure; and/or (iii) send the network traffic, based on the processing, out another network interface on the target-side network device (108) towards a destination. Concerning one or more embodiments disclosed herein, the target-side network device (108) may include at least functionality to perform the methods outlined in FIGS. 5A and 5B, below, which may be directed to L1 connectivity emulation and clock rate control using buffered data state, respectively. One of ordinary skill, however, will appreciate that the target-side network (108) may perform other functionalities without departing from the scope of the invention. While the source-side network device (104) and the target-side network device (108) are described in terms of one direction of communication, one of ordinary skill will appreciate that, in at least some embodiments, each network device (104, 108) can operate as both a source and target for network traffic in different directions.

In one embodiment of the disclosure, how the target-side network device (108) makes the above-mentioned determination to drop network traffic (e.g., protocol data units), and/or send network traffic to another system (100) component (e.g., network (106) or one or more data targets (110A-110N)), depends, at least in part, on whether the target-side network device (108) is a layer 2 (L2) switch or a layer 3 (L3) switch (also referred to as a multilayer switch)— the latter of which may perform at least some functions of a router. More specifically, if the target-side network device (108) operates as a L2 switch, the source-side network device (104) may use a destination media access control (MAC) address (specified within header information of network traffic) along with a forwarding table or policy to determine out of which network interface to send the network traffic. Alternatively, if the target-side network device (108) operates as a L3 switch, the target-side network device (108) may use a destination Internet Protocol (IP) address (specified within header information of network traffic) along with a routing table or policy to determine out of which network interface to send the network traffic. Further, if the target-side network device (108) operates as a multilayer switch, the target-side network device (108) may include functionality to process network traffic using both MAC addresses and IP addresses.

In one embodiment of the disclosure, the persistent storage on the target-side network device (108) may include any type of non-transitory computer readable medium that includes computer readable program code (or instructions), which when executed by at least one computer processor, enables the target-side network device (108) to perform any of the functionalities described herein. Moreover, examples of the target-side network device (108) may include, but are not limited to, a switch, a router, a multilayer switch, a fibre channel (FC) device, and an InfiniBand® device. The target-side network device (108) is not limited to the aforementioned specific examples. Further, the target-side network device (108) is described in further detail in FIG. 3, below.

In one embodiment of the disclosure, the source-side network device (104), the network (106), and the target-side network device (108) may collectively implement a physical layer (or L1) connectivity abstraction (112). That is, through one or more embodiments disclosed herein, the L1 connectivity abstraction (112) may emulate a direct connection between the data source (102) and the data target(s) (110A-110N). Further, in emulating a direct connection, the L1 connectivity abstraction (112) may include functionality to transport or replicate the physical properties (e.g., errors, proprietary signaling, clock frequency, etc.) of any data streams exchanged between the data source (102) and the data target(s) (110A-110N).

In one embodiment of the disclosure, a data target (110A-110N) may represent any physical computing device (or end point) (e.g., implemented through computer software, firmware, and hardware) that may be configured to generate, transmit, receive, and/or process data. A data target (110A-110N) may include functionality to communicate with— i.e., transmit data to (and/or receive data from)— the data source (102) (described above). Though a data target (110A-110N) and the data source (102) may be indirectly connected (via at least the source-side network device (104), the network (106), and the target-side network device (108)) based on one or more embodiments disclosed herein, a data target (110A-110N) may communicate with the data source (102) with the presumption of a direct connection therebetween. One of ordinary skill will appreciate that a data target (110A-110N) may perform other functionalities without departing from the scope of the disclosure.

Further, in one embodiment of the disclosure, a data target (110A-110N) may include, but is not limited to, one or more computer processors (e.g., integrated circuits), memory, persistent storage, and one or more physical network interfaces (also referred to as ports). Examples of a data target (110A-110N) may include, but are not limited to, a server, a desktop computer, a laptop computer, a tablet computer, a smartphone, a device under test (DUT), or any other type of computing device including the aforementioned minimum requirements.

While FIG. 1 shows a configuration of components, other system (100) configurations may be used without departing from the scope of the disclosure.

Figure 2:
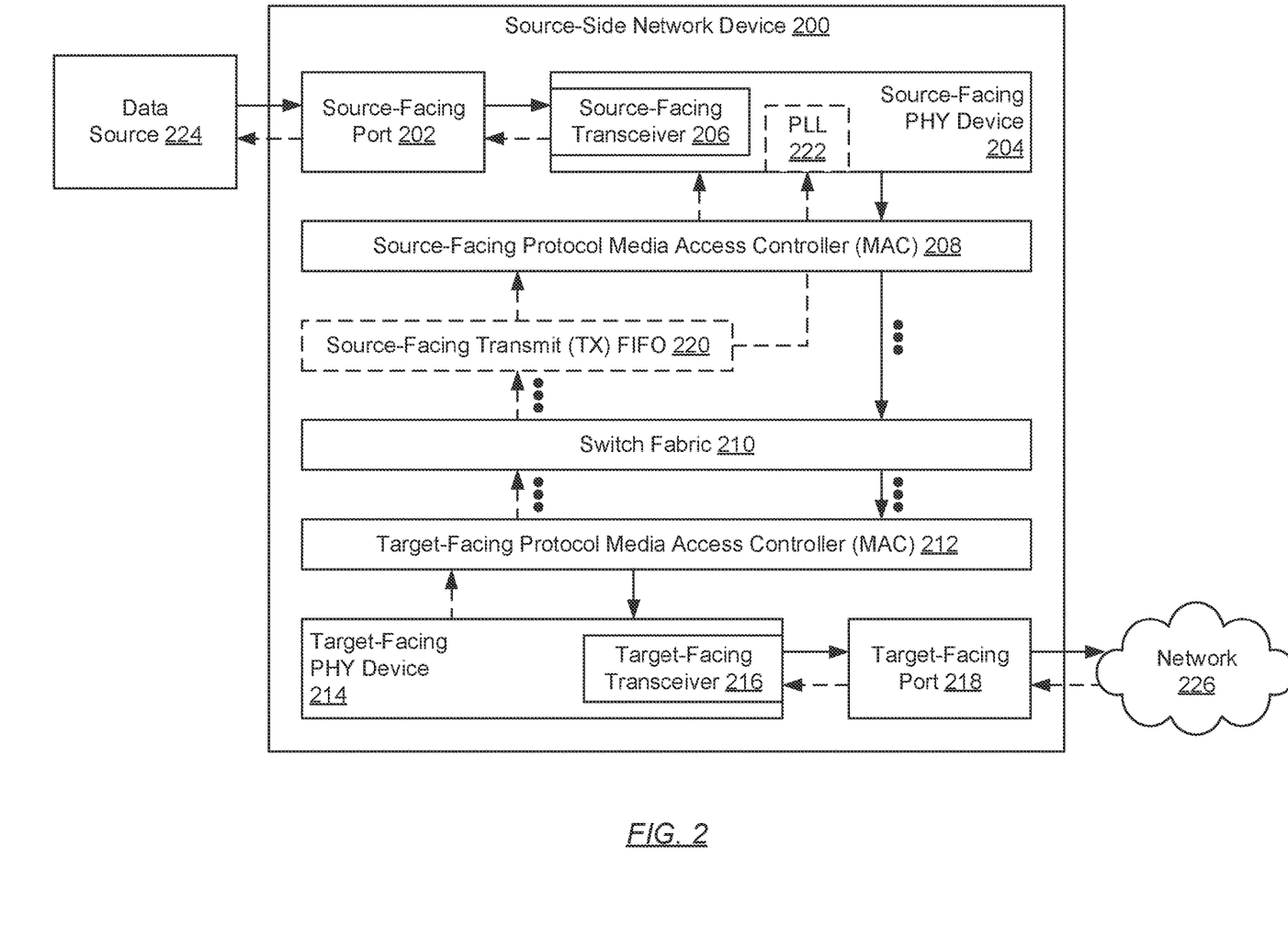
FIG. 2 shows a source-side network device in accordance with one or more embodiments of the disclosure.

FIG. 2 shows a source-side network device in accordance with one or more embodiments of the disclosure. The source-side network device (200) may include a source-facing port (202), a source-facing physical layer (PHY) device (204), a source-facing protocol media access controller (MAC) (208), a switch fabric (210), a target-facing protocol MAC (212), a target-facing PHY device (214), and a target-facing port (218). Each of these source-side network device (200) subcomponents is described below.

In one embodiment of the disclosure, the source-facing port (202) may represent a physical (i.e., hardware) communication interface through which the source-side network device (200) directly connects to the data source (224) (described above) (see e.g., element 102 in FIG. 1). To that extent, the source-facing port (202) may include functionality to couple with one end of a physical transmission medium (e.g., a cable) (not shown), where the other end of the physical transmission medium may terminate at another, compatible physical communication interface disposed on the data source (224). By way of examples, the source-facing port (202), as well as the aforementioned physical transmission medium, may be implemented using any existing Ethernet over twisted pair, optical fiber, or coaxial cable technologies.

In one embodiment of the disclosure, the source-facing PHY device (204) may represent an assembly of integrated circuits configured to implement PHY functionalities of the Open Systems Interconnection (OSI) model for computer networking. The aforementioned PHY functionalities may include, but are not limited to: receiving data (in analog form) (e.g., electrical or optical fluctuations) from the data source (224) via the source-facing port (202); encoding the received data (in analog form) to produce data (in digital form) (e.g., bit-streams, or sequences of binary bits); providing the produced data (in digital form) to the source-facing protocol MAC (208) for processing; obtaining other data (in digital form) from the source-facing protocol MAC (208); decoding the obtained other data (in digital form) to produce other data (in analog form); and transmitting the produced other data (in analog form) to the data source (224) via the source-facing port (202). One of ordinary skill, however, will appreciate that the source-facing PHY device (204) may perform other functionalities without departing from the scope of the disclosure.

In one embodiment of the disclosure, to facilitate at least the above-mentioned receiving and transmitting of data (in analog form) from and to the data source (224), the source-facing PHY device (204) may include a source-facing transceiver (206). The source-facing transceiver (206), accordingly, may represent one or more integrated circuits configured for data transmission, data reception, and the management thereof. Further, the above-mentioned encoding and/or decoding of data (in analog form) to data (in digital form) (and vice versa) may employ any existing digital modulation (i.e., digital-to-analog conversion) and/or digital demodulation (i.e., analog-to-digital conversion) techniques.

In one embodiment of the disclosure, data (in analog form) may refer to a continuous-time electrical or optical signal, which may characterize the data using electrical or optical pulses of varying amplitude (i.e., having an infinite spectrum of values). In contrast, data (in digital form) may refer to a discrete-time electrical or optical signal, which may alternatively characterize the data using electrical or optical pulses of fixed amplitude (i.e., having a finite set— usually a pair— of values).

In one embodiment of the disclosure, the source-facing protocol MAC (208) may represent one or more integrated circuits configured to implement MAC (or data-link layer) functionalities of the OSI model for computer networking. The aforementioned MAC functionalities may include, but are not limited to: obtaining data (in digital form) (e.g., bit-streams) from the source-facing PHY device (204); processing the obtained bit-streams through, for example, boundary detection and/or ingress clock frequency sampling, to produce bit-stream chunks; and providing the produced bit-stream chunks to the switch fabric (210). One of ordinary skill, however, will appreciate that the source-facing protocol MAC (208) may perform other functionalities without departing from the scope of the disclosure.

In one embodiment of the disclosure, the switch fabric (210) may represent a physical bridge (e.g., implemented through one or more integrated circuits), a logical bridge (e.g., implemented through computer software), or a combination thereof, configured to determine out of which PHY device (e.g., target-facing PHY device (214)), and corresponding communications port (e.g., target-facing port (218)), to send data towards a particular destination (e.g., the target-side network device (not shown) via the network (226)). To that extent, the switch fabric (210) may include one or more data processing pipelines (not shown) (i.e., one or more sets of successive data processing elements or stages), which examine the data, in conjunction with programmed data structures, policies, rules, and/or other information, to make the aforementioned determination. Further, through these data processing pipeline(s), the switch fabric (210) may include functionality to: obtain bit-stream chunks from the source-facing protocol MAC (208); determine, as previously described, at least out of which port (e.g., target-facing port (218)) through which the obtained bit-stream chunks should be transmitted; identify the protocol MAC (e.g., target-facing protocol MAC (212)) associated with, and thus connected to, the determined port; and provide the bit-stream chunks to the identified protocol MAC accordingly. One of ordinary skill, however, will appreciate that the switch fabric (210) may perform other functionalities without departing from the scope of the disclosure.

In one embodiment of the disclosure, the target-facing protocol MAC (212) may represent one or more integrated circuits configured to implement MAC (or data-link layer) functionalities of the OSI model for computer networking. The aforementioned MAC functionalities may include, but are not limited to: obtaining bit-stream chunks from the switch fabric (210); packaging the obtained bit-stream chunks into one or more protocol data units (e.g., Ethernet frames) conforming to any networking protocol (e.g., Ethernet); and providing the protocol data unit(s) (as data in digital form) to the target-facing PHY device (214) for modulation and transmission. One of ordinary skill, however, will appreciate that the target-facing protocol MAC (212) may perform other functionalities without departing from the scope of the disclosure.

In one embodiment of the disclosure, the target-facing PHY device (214) may represent an assembly of integrated circuits configured to implement PHY functionalities of the OSI model for computer networking. The aforementioned PHY functionalities may include, but are not limited to: receiving data (in analog form) (e.g., electrical or optical fluctuations) from the network (226) via the target-facing port (218); encoding the received data (in analog form) to produce data (in digital form) (e.g., bit-streams); providing the produced data (in digital form) to the target-facing protocol MAC (212) for processing; obtaining other data (in digital form) from the target-facing protocol MAC (212); decoding the obtained other data (in digital form) to produce other data (in analog form); and transmitting the produced other data (in analog form) to the network (226) via the target-facing port (218). One of ordinary skill, however, will appreciate that the target-facing PHY device (214) may perform other functionalities without departing from the scope of the disclosure.

In one embodiment of the disclosure, to facilitate at least the receiving and transmitting of data (in analog form) from and to the network (226), the target-facing PHY device (214) may encompass a target-facing transceiver (216). The target-facing transceiver (216), accordingly, may represent one or more integrated circuits configured for data transmission, data reception, and the management thereof. Further, the aforementioned encoding and/or decoding of data (in analog form) to data (in digital form) (and vice versa) may employ any existing digital modulation (i.e., digital-to-analog conversion) and/or digital demodulation (i.e., analog-to-digital conversion) techniques.

In one embodiment of the disclosure, the target-facing port (218) may represent a physical (i.e., hardware) communication interface through which the source-side network device (200) operatively connects to the target-side network device (not shown) via the network (226) (described above) (see e.g., element 106 in FIG. 1). To that extent, the target-facing port (218) may include functionality to couple with one end of a physical transmission medium (e.g., a cable) (not shown), where the other end of the physical transmission medium may terminate at another, compatible physical communication interface disposed on a device (or system) (e.g., a switch, a router, a gateway, etc.) (not shown) at an edge of the network (226). By way of examples, the target-facing port (218), as well as the aforementioned physical transmission medium, may be implemented using any existing Ethernet over twisted pair, optical fiber, or coaxial cable technologies.

While FIG. 2 shows a configuration of subcomponents, other source-side network device (200) configurations may be used without departing from the scope of the disclosure. For example, in one or more embodiments of the disclosure, the source-side network device (200) may further include a source-facing transmit (TX) first-in, first-out (FIFO) buffer (220), as well as a TX phase-lock loop (PLL) (222) disposed within the source-facing PHY device (204). The source-facing TX FIFO buffer (220) may represent a read-write memory array configured to temporarily store or write, and subsequently release or read, data intended for egress (or transmission) through the source-facing protocol MAC (208), the source-facing PHY device (204), and the source-facing port (202). The source-facing TX FIFO buffer (220) may manage the aforementioned data based on a chronological order in which the data enters (or is submitted to) the source-facing TX FIFO buffer (220). That is, a first data that arrives in the source-facing TX FIFO buffer (220) may also be the first data to leave the source-facing TX FIFO buffer (220).

Furthermore, in the above-mentioned embodiment(s) of the disclosure, a FIFO state of the source-facing TX FIFO buffer (220)— indicating a current fill level thereof relative to a FIFO depth thereof— may be monitored and used to drive (or serve as input) to the TX PLL (222). The current fill level may reference a cardinality of data (e.g., a number of bit-stream chunks) that have been written, and thus stored, into the source-facing TX FIFO buffer (220) at any given point-in-time, whereas the FIFO depth may reference a maximum cardinality of data (e.g., a maximum number of bit-stream chunks) that the source-facing TX FIFO buffer (220) may be configured to hold. Meanwhile, the TX PLL (222) may represent one or more integrated circuits configured to generate a transmit clock signal, which may be associated with the transmission (and thus influence the transmit data rate) of data to the data source (224).

In the above-mentioned embodiment(s) of the disclosure, the switch fabric (210) may include further functionality to: obtain bit-stream chunks from the target-facing protocol MAC (212); make a determination (described above) as to which communications port (e.g., source-facing port (202)) to send the obtained bit-stream chunks to the data source (224); based on the determination, identify the source-facing TX FIFO buffer (220); and write the obtained bit-stream chunks into the identified source-facing TX FIFO buffer (220). On the other hand, the source-facing protocol MAC (208) may include further functionality to: monitor the above-mentioned FIFO state of the source-facing TX FIFO buffer (220); upon the FIFO state reaching a predefined fill-threshold (e.g., half or 50% of a configured FIFO depth of the source-facing TX FIFO buffer (220)), read the written bit-stream chunks from the source-facing TX FIFO buffer (220); reconstruct bit-streams using the read bit-stream chunks; and provide the reconstructed bit-streams (e.g., data in digital form) to the source-facing PHY device (204) for modulation and transmission. Moreover, the source-facing PHY device (204) may include further functionality to: manage an egress clock frequency (or TX data rate) based on the FIFO state of the source-facing TX FIFO buffer (220) (described below) (see e.g., FIG. 5B).

Figure 3:
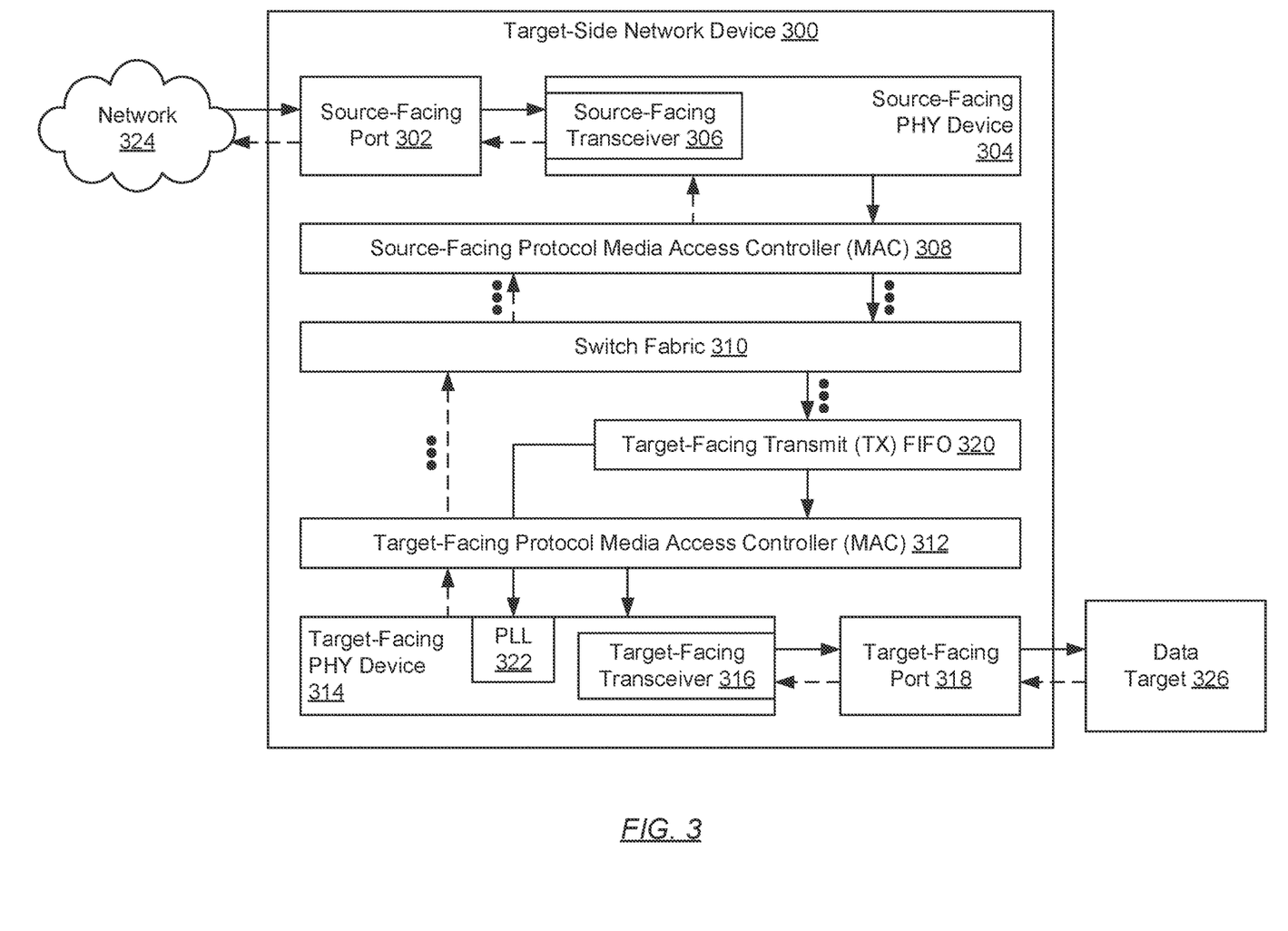
FIG. 3 shows a target-side network device in accordance with one or more embodiments of the disclosure.

FIG. 3 shows a target-side network device in accordance with one or more embodiments of the disclosure. The target-side network device (300) may include a source-facing port (302), a source-facing physical layer (PHY)

device (304), a source-facing protocol media access controller (MAC) (308), a switch fabric (310), a target-facing protocol MAC (312), a target-facing PHY device (314), a target-facing port (318), and a target-facing transmit (TX) first-in, first-out (FIFO) buffer (320). Each of these target-side network device (300) subcomponents is described below.

In one embodiment of the disclosure, the source-facing port (302) may represent a physical (i.e., hardware) communication interface through which the target-side network device (300) operatively connects to the source-side network device (not shown) via the network (324) (described above) (see e.g., element 106 in FIG. 1). To that extent, the source-facing port (302) may include functionality to couple with one end of a physical transmission medium (e.g., a cable) (not shown), where the other end of the physical transmission medium may terminate at another, compatible physical communication interface disposed on a device (or system) (e.g., a switch, a router, a gateway, etc.) (not shown) at an edge of the network (324). By way of examples, the source-facing port (302), as well as the aforementioned physical transmission medium, may be implemented using any existing Ethernet over twisted pair, optical fiber, or coaxial cable technologies.

In one embodiment of the disclosure, the source-facing PHY device (304) may represent an assembly of integrated circuits configured to implement PHY functionalities of the Open Systems Interconnection (OSI) model for computer networking. The aforementioned PHY functionalities may include, but are not limited to: receiving data (in analog form) (e.g., electrical or optical fluctuations) from the network (324) via the source-facing port (302); encoding the received data (in analog form) to produce data (in digital form) (e.g., bit-streams, or sequences of binary bits); providing the produced data (in digital form) to the source-facing protocol MAC (308) for processing; obtaining other data (in digital form) from the source-facing protocol MAC (308); decoding the obtained other data (in digital form) to produce other data (in analog form); and transmitting the produced other data (in analog form) to the network (324) via the source-facing port (302). One of ordinary skill, however, will appreciate that the source-facing PHY device (304) may perform other functionalities without departing from the scope of the disclosure.

In one embodiment of the disclosure, to facilitate at least the above-mentioned receiving and transmitting of data (in analog form) from and to the network (324), the source-facing PHY device (304) may include a source-facing transceiver (306). The source-facing transceiver (306), accordingly, may represent one or more integrated circuits configured for data transmission, data reception, and the management thereof. Further, the above-mentioned encoding and/or decoding of data (in analog form) to data (in digital form) (and vice versa) may employ any existing digital modulation (i.e., digital-to-analog conversion) and/or digital demodulation (i.e., analog-to-digital conversion) techniques.

In one embodiment of the disclosure, the source-facing protocol MAC (308) may represent one or more integrated circuits configured to implement MAC (or data-link layer) functionalities of the OSI model for computer networking. The aforementioned MAC functionalities may include, but are not limited to: obtaining data (in digital form) (e.g., bit-streams) from the source-facing PHY device (304); processing the obtained bit-streams through, for example, boundary detection and/or ingress clock frequency sampling, to produce bit-stream chunks; providing the produced bit-stream chunks to the switch fabric (310); obtaining other bit-stream chunks from the switch fabric (310); packaging the obtained other bit-stream chunks into one or more protocol data units (e.g., Ethernet frames) conforming to any networking protocol (e.g., Ethernet); and providing the protocol data unit(s) (as data in digital form) to the source-facing PHY device (304) for modulation and transmission. One of ordinary skill, however, will appreciate that the source-facing protocol MAC (308) may perform other functionalities without departing from the scope of the disclosure.

In one embodiment of the disclosure, the switch fabric (310) may represent a physical bridge (e.g., implemented through one or more integrated circuits), a logical bridge (e.g., implemented through computer software), or a combination thereof, configured to determine out of which PHY device (e.g., target-facing PHY device (314) or source-facing PHY device (304)), and corresponding communications port (e.g., target-facing port (318) or source-facing port (302)), to send data towards a particular destination (e.g., a data target (326) or the source-side network device (not shown) via the network (324)). To that extent, the switch fabric (310) may include one or more data processing pipelines (not shown) (i.e., one or more sets of successive data processing elements or stages), which examine the data, in conjunction with programmed data structures, policies, rules, and/or other information, to make the aforementioned determination. Further, through these data processing pipeline(s), the switch fabric (310) may include functionality to: obtain bit-stream chunks from the target-facing protocol MAC (312) or the source-facing protocol MAC (308); determine, as previously described, at least out of which port (e.g., target-facing port (318) or source-facing port (302)) through which the obtained bit-stream chunks should be transmitted; identify the protocol MAC (e.g., target-facing protocol MAC (312) or source-facing protocol MAC (308)) associated with, and thus connected to, the determined port; and write the bit-stream chunks into the target-facing TX FIFO buffer (320), or provide the bit-stream chunks to the identified source-facing protocol MAC (308), accordingly. One of ordinary skill, however, will appreciate that the switch fabric (310) may perform other functionalities without departing from the scope of the disclosure.

In one embodiment of the disclosure, the target-facing protocol MAC (312) may represent one or more integrated circuits configured to implement MAC (or data-link layer) functionalities of the OSI model for computer networking. The aforementioned MAC functionalities may include, but are not limited to: monitoring a FIFO state of the target-facing TX FIFO buffer (320); upon the FIFO state reaching a predefined fill-threshold (e.g., half or 50% of a configured FIFO depth of the target-facing TX FIFO buffer (320)), reading the written bit-stream chunks from the target-facing TX FIFO buffer (320); reconstructing bit-streams using the read bit-stream chunks; providing the reconstructed bit-streams (e.g., data in digital form) to the target-facing PHY device (314) for modulation and transmission; obtaining other bit-streams from the target-facing PHY device (314); processing the obtained other bit-streams through, for example, boundary detection and/or ingress clock frequency sampling, to produce other bit-stream chunks; and providing the produced other bit-stream chunks to the switch fabric (310). One of ordinary skill, however, will appreciate that the target-facing protocol MAC (312) may perform other functionalities without departing from the scope of the disclosure.

In one embodiment of the disclosure, the target-facing PHY device (314) may represent an assembly of integrated circuits configured to implement PHY functionalities of the OSI model for computer networking. The aforementioned PHY functionalities may include, but are not limited to: receiving data (in analog form) (e.g., electrical or optical fluctuations) from a data target (326) via the target-facing port (318); encoding the received data (in analog form) to produce data (in digital form) (e.g., bit-streams); providing the produced data (in digital form) to the target-facing protocol MAC (312) for processing; obtaining other data (in digital form) from the target-facing protocol MAC (312); decoding the obtained other data (in digital form) to produce other data (in analog form); and transmitting the produced other data (in analog form) to a data target (326) via the target-facing port (318). One of ordinary skill, however, will appreciate that the target-facing PHY device (314) may perform other functionalities without departing from the scope of the disclosure.

In one embodiment of the disclosure, to facilitate at least the receiving and transmitting of data (in analog form) from and to a data target (326), the target-facing PHY device (314) may include a target-facing transceiver (316). The target-facing transceiver (316), accordingly, may represent one or more integrated circuits configured for data transmission, data reception, and the management thereof. Further, the aforementioned encoding and/or decoding of data (in analog form) to data (in digital form) (and vice versa) may employ any existing digital modulation (i.e., digital-to-analog conversion) and/or digital demodulation (i.e., analog-to-digital conversion) techniques.

In one embodiment of the disclosure, the target-facing PHY device (314) may further include a TX phase-lock loop (PLL) (322). The TX PLL (322) may represent one or more integrated circuits configured to generate a transmit clock signal, which may be associated with the transmission (and thus a transmit data rate) of data to a data target (326).

In one embodiment of the disclosure, the target-facing port (318) may represent a physical (i.e., hardware) communication interface through which the target-side network device (300) directly connects to a data target (326) (described above) (see e.g., elements 100A-110N in FIG. 1). To that extent, the target-facing port (318) may include functionality to couple with one end of a physical transmission medium (e.g., a cable) (not shown), where the other end of the physical transmission medium may terminate at another, compatible physical communication interface disposed on a data target (326). By way of examples, the target-facing port (318), as well as the aforementioned physical transmission medium, may be implemented using any existing Ethernet over twisted pair, optical fiber, or coaxial cable technologies.

In one embodiment of the disclosure, the target-facing TX FIFO buffer (320) may represent a read-write memory array configured to temporarily store or write, and subsequently release or read, data intended for egress (or transmission) through the target-facing protocol MAC (312), the target-facing PHY device (314), and the target-facing port (318). The target-facing TX FIFO buffer (320) may manage the aforementioned data based on a chronological order in which the data enters (or is submitted to) the target-facing TX FIFO buffer (320). That is, a first data that arrives in the target-facing TX FIFO buffer (320) may also be the first data to leave the target-facing TX FIFO buffer (320).

Furthermore, in one embodiment of the disclosure, a FIFO state of the target-facing TX FIFO buffer (320)— indicating a current fill level thereof relative to a FIFO depth thereof— may be monitored and used to drive (or serve as input) to the TX PLL (322) (described above). The current fill level may reference a cardinality of data (e.g., a number of bit-stream chunks) that have been written, and thus stored, into the target-facing TX FIFO buffer (320) at any given point-in-time, whereas the FIFO depth may reference a maximum cardinality of data (e.g., a maximum number of bit-stream chunks) that the target-facing TX FIFO buffer (320) may be configured to hold.

While FIG. 3 shows a configuration of subcomponents, other target-side network device (300) configurations may be used without departing from the scope of the disclosure.

Figure 4:
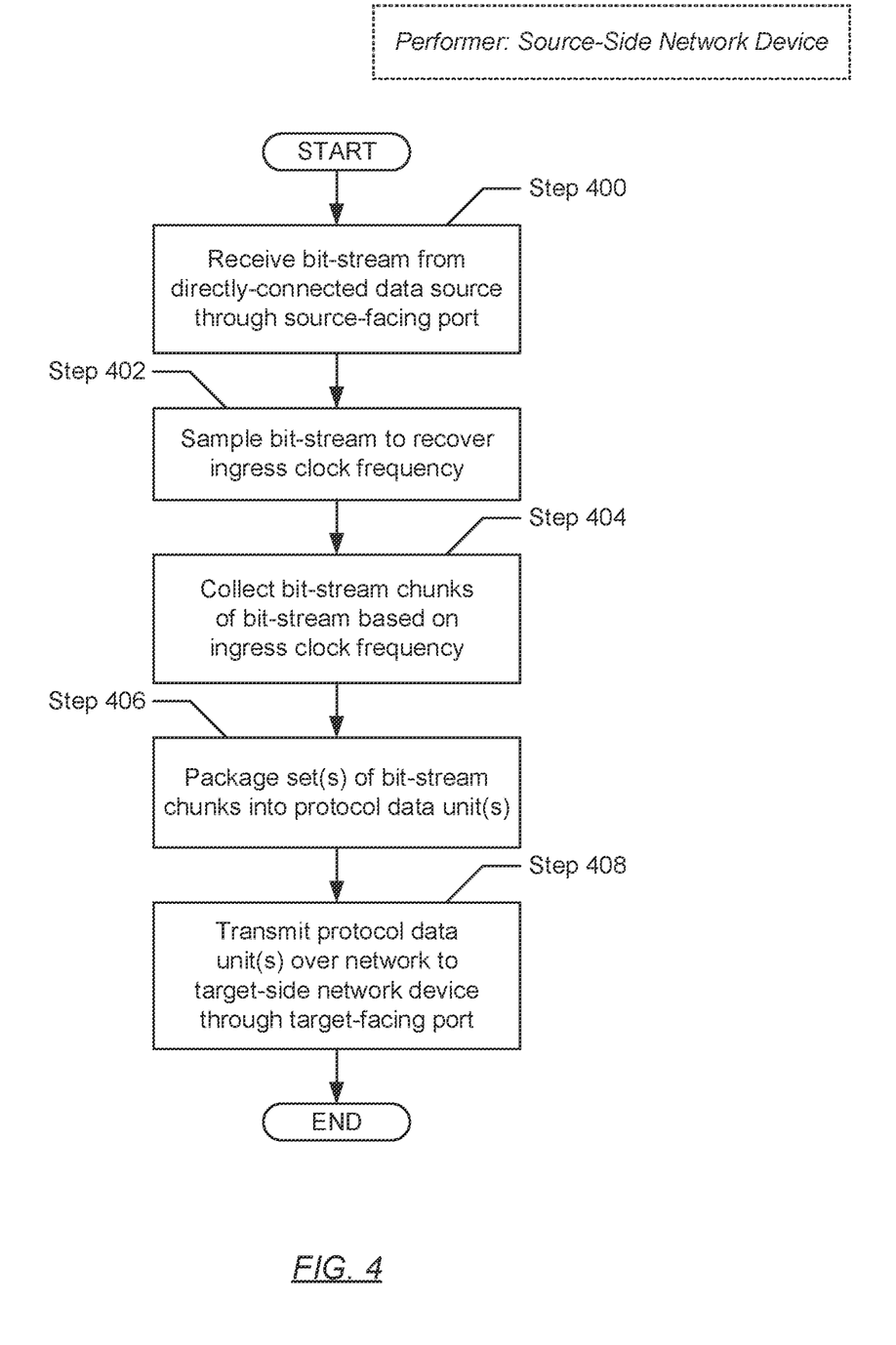
FIG. 4 shows a flowchart describing a method for source-side layer 1 (L1) connectivity emulation in accordance with one or more embodiments of the disclosure.

FIG. 4 shows a flowchart describing a method for source-side layer 1 (L1) connectivity emulation in accordance with one or more embodiments of the disclosure. The various steps outlined below may be performed by the source-side network device (see e.g., FIGS. 1 and 2). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, data is received from a directly-connected data source. In one embodiment of the disclosure, the data may initially be received, via a physical transmission medium coupled to the data source and a source-facing port of the source-side network device, as an analog signal. The analog signal may subsequently undergo digital demodulation (or analog-to-digital conversion) to obtain a bit-stream representative of the received data. A bit-stream may refer to a sequence of binary bits.

In Step 402, the bit-stream (obtained in Step 400) is sampled to recover an ingress clock frequency. In one embodiment of the disclosure, through sampling of the bit-stream, timing information, detailing the transitions in the bit-stream, may be extracted therefrom. The timing information, subsequently, may be used to generate an ingress clock signal (e.g., via phase alignment using a phase-lock loop (PLL)), which may be associated with (yet had not accompanied) the above-mentioned analog signal received through the physical transmission medium and the source-facing port. Further, from characteristics of the generated ingress clock signal, the ingress clock frequency (or frequency of the ingress clock signal) may be obtained and, accordingly, so can an ingress (or receive (RX)) data rate be deduced. The RX data rate (also referred to as the RX bit rate) may refer to the speed of which the bit-stream (or a number of binary bits, of the bit-stream, per unit of time) is received from the data source.

In Step 404, one or more bit-stream chunks is/are collected based on the ingress clock frequency (recovered in Step 402). Specifically, in one embodiment of the disclosure, the ingress clock frequency may be used, for example, in boundary detection and/or encoding processes to segment the bit-stream into the bit-stream chunk(s). Thereafter, in Step 406, the bit-stream chunk(s) (collected in Step 404) is/are packaged (or encapsulated) into one or more protocol data units (e.g., Ethernet frames), which may conform to any networking protocol (e.g., Ethernet).

In Step 408, the protocol data unit(s) (produced in Step 406) is/are subsequently transmitted, via a target-facing port of the source-side network device and over a network, to a target-side network device.

Figure 5A:
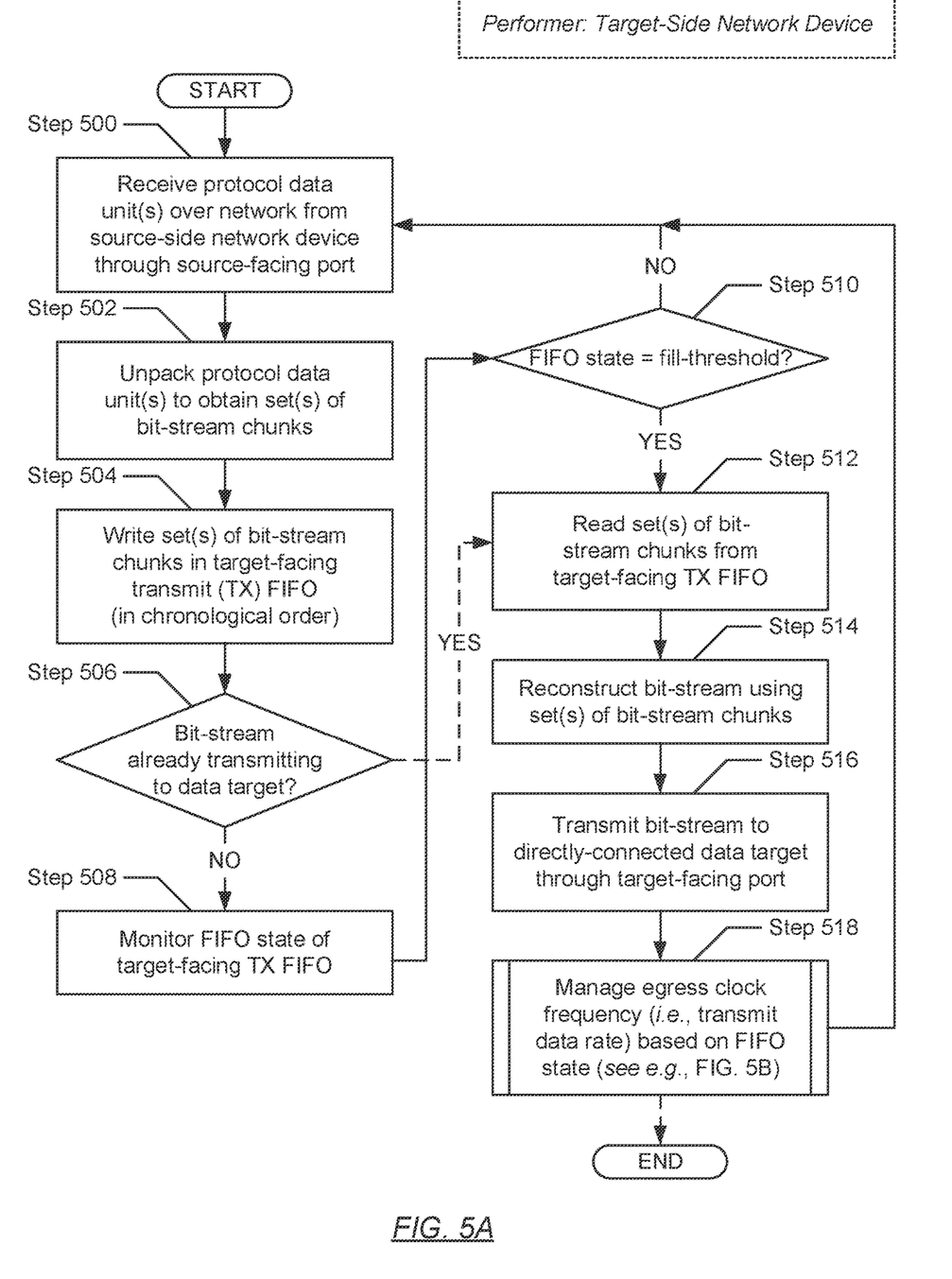
FIG. 5A shows a flowchart describing a method for target-side L1 connectivity emulation in accordance with one or more embodiments of the disclosure.

FIG. 5A shows a flowchart describing a method for target-side L1 connectivity emulation in accordance with one or more embodiments of the disclosure. The various steps outlined below may be performed by the target-side network device (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

Turning to FIG. 5A, in Step 500, one or more protocol data units (e.g., Ethernet frames), conforming to any networking protocol (e.g., Ethernet), is/are received. In one embodiment of the disclosure, the protocol data unit(s) may have arrived from a source-side network device over a network and through a source-facing port of the target-side network device.

In Step 502, the protocol data unit(s) (received in Step 500) is/are unpacked (or decapsulated) to obtain one or more bit-stream chunks. Subsequently, in Step 504, the bit-stream chunk(s) (obtained in Step 502) is/are written into a target-facing transmit (TX) first-in, first-out (FIFO) buffer.

In Step 506, a determination is made as to whether a bit-stream (reconstructed using previously obtained bit-stream chunk(s)) is already transmitting to one or more data targets. In one embodiment of the disclosure, if it is determined that transmission of the bit-stream, to the data target(s), has already commenced (based on a FIFO state of the target-facing TX FIFO buffer reaching a fill-threshold), then the process proceeds to Step 512. On the other hand, in another embodiment of the disclosure, if it is alternatively determined that transmission of the bit-stream, to the data target(s), has not yet commenced (based on a FIFO state of the target-facing TX FIFO buffer not yet reaching the fill-threshold), then the process alternatively proceeds to Step 508.

In Step 508, following the determination (in Step 506) that a bit-stream is not already transmitting to one or more data targets, a FIFO state of the target-facing TX FIFO buffer is monitored. In one embodiment of the disclosure, the FIFO state may serve as an indicator for indicating a current fill level of the target-facing TX FIFO buffer in relation to a FIFO depth thereof. The current fill level may reference a cardinality of data (e.g., a number of bit-stream chunks) that have been written, and thus stored, into the target-facing TX FIFO buffer at any given point-in-time, whereas the FIFO depth may reference a maximum cardinality of data (e.g., a maximum number of bit-stream chunks) that the target-facing TX FIFO buffer may be configured to hold.

In Step 510, a determination is made as to whether the FIFO state (monitored in Step 508) has reached a fill-threshold. The fill-threshold may refer to a predefined reference fill level of the target-facing TX FIFO buffer, relative to the FIFO depth thereof. Accordingly, in one embodiment of the disclosure, if it is determined that the FIFO state has at least reached the fill-threshold, then the process proceeds to Step 512. On the other hand, in another embodiment of the disclosure, if it is alternatively determined that the FIFO state has not yet reached the fill-threshold, then the process alternatively proceeds to Step 500, where one or more additional protocol data units may be received.

In Step 512, following the determination (in Step 506) that a bit-stream is already transmitting to one or more data targets, or following the determination (in Step 510) that a FIFO state of the target-facing TX FIFO buffer has at least reached a fill-threshold, the bit-stream chunk(s) (written thereto in Step 504) is read from the target-facing TX FIFO buffer. Thereafter, in Step 514, the bit-stream chunk(s) (read in Step 512) are concatenated, in chronological or FIFO order, to append to the already-transmitting bit-stream (or reconstruct a bit-stream that has yet to be transmitted).

In Step 516, the bit-stream (appended to or reconstructed in Step 514) is continued to be (or subsequently) transmitted to one or more directly-connected data targets, and via one or more target-facing ports, respectively. In Step 518, an egress clock frequency, and accordingly, a TX data rate, associated with the transmission of the bit-stream, is hereinafter managed based on the monitored dynamics of FIFO state of the target-facing TX FIFO buffer. Management of egress clock frequency (and/or the TX data rate) is described in further detail in FIG. 5B, below. Following the aforementioned management, the process may proceed to Step 500, where one or more additional protocol data units may be received or, alternatively, if there are no more additional protocol data units to be received, the process ends.

Figure 5B:
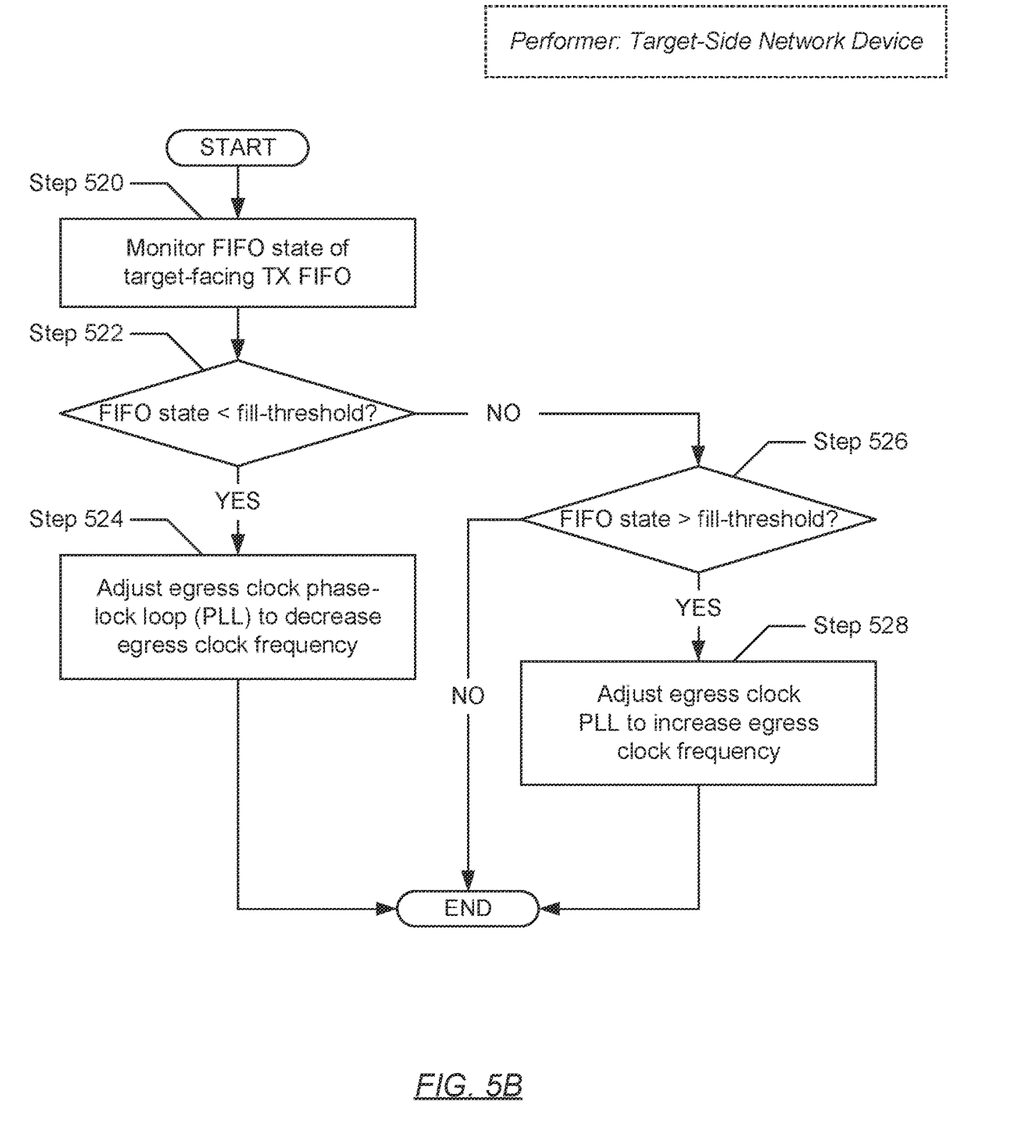
FIG. 5B shows a flowchart describing a method for clock rate control using buffered data state in accordance with one or more embodiments of the disclosure.

FIG. 5B shows a flowchart describing a method for clock rate control using buffered data state in accordance with one or more embodiments of the disclosure. The various steps outlined below may be performed by the target-side network device (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

Turning to FIG. 5B, in Step 520, a continually changing first-in, first-out (FIFO) state of a target-facing transmit (TX) FIFO buffer is monitored. In one embodiment of the disclosure, the FIFO state may serve as an indicator for indicating a current fill level of the target-facing TX FIFO buffer in relation to a FIFO depth thereof. The current fill level may reference a cardinality of data (e.g., a number of bit-stream chunks) that have been written, and thus stored, into the target-facing TX FIFO buffer at any given point-in-time, whereas the FIFO depth may reference a maximum cardinality of data (e.g., a maximum number of bit-stream chunks) that the target-facing TX FIFO buffer may be configured to hold.

In Step 522, a determination is made as to whether the FIFO state (monitored in Step 520) lies below a fill-threshold (i.e., the same fill-threshold mentioned in FIG. 5A, above). In one embodiment of the disclosure, if it is determined that the FIFO state is indeed below the fill-threshold, then the process proceeds to Step 524. On the other hand, in another embodiment of the disclosure, if it is alternatively determined that the FIFO state at least matches the fill-threshold, then the process alternatively proceeds to Step 526.

In Step 524, following the determination (in Step 522) that the FIFO state (monitored in Step 520) lies below the fill-threshold, an egress clock phase-lock loop (PLL) (or a PLL configured to generate a transmit clock signal associated with the transmission of a bit-stream to one or more data targets) is adjusted. Specifically, in one embodiment of the disclosure, the egress clock PLL may be adjusted such that a frequency of the transmit clock signal decreases, thereby leading to a decrease in the transmit data rate of the bit-stream, which would allow the TX FIFO buffer to fill more rapidly. Hereinafter, the process ends.

In Step 526, following the alternative determination (in Step 522) that the FIFO state (monitored in Step 520) at least matches the fill-threshold, another determination is made as to whether the FIFO state exceeds the fill-threshold. In one embodiment of the disclosure, if it is determined that the FIFO state indeed exceeds the fill-threshold, then the process proceeds to Step 528. On the other hand, in another embodiment of the disclosure, if it is alternatively determined that the FIFO state exactly matches the fill-threshold, then the process ends.

In Step 528, following the determination (in Step 526) that the FIFO state (monitored in Step 520) exceeds the fill-threshold, an egress clock PLL (or a PLL configured to generate a transmit clock signal associated with the transmission of a bit-stream to one or more data targets) is adjusted. Specifically, in one embodiment of the disclosure, the egress clock PLL may be adjusted such that a frequency of the transmit clock signal increases, thereby leading to an increase in the transmit data rate of the bit-stream, which would allow the TX FIFO buffer to empty more rapidly. Hereinafter, the process ends.

In one embodiment of the disclosure, through the maintenance of the FIFO state, of the target-facing TX FIFO buffer, at or near the fill-threshold (e.g., at or near half or 50% of the FIFO depth thereof), the transmit data rate of the bit-stream, by the target-side network device and to the data target(s), may be manipulated to match (or nearly-match) a receive data rate of the bit-stream, by the source-side network device and from the data source. Further, through the matching of aforementioned transmit and receive data rates, along with the transportation or replication of other physical properties (e.g., errors, proprietary signaling, etc.), a physical layer (or L1) connectivity abstraction between the data source and the data target(s) may be achieved.

Figure 6:
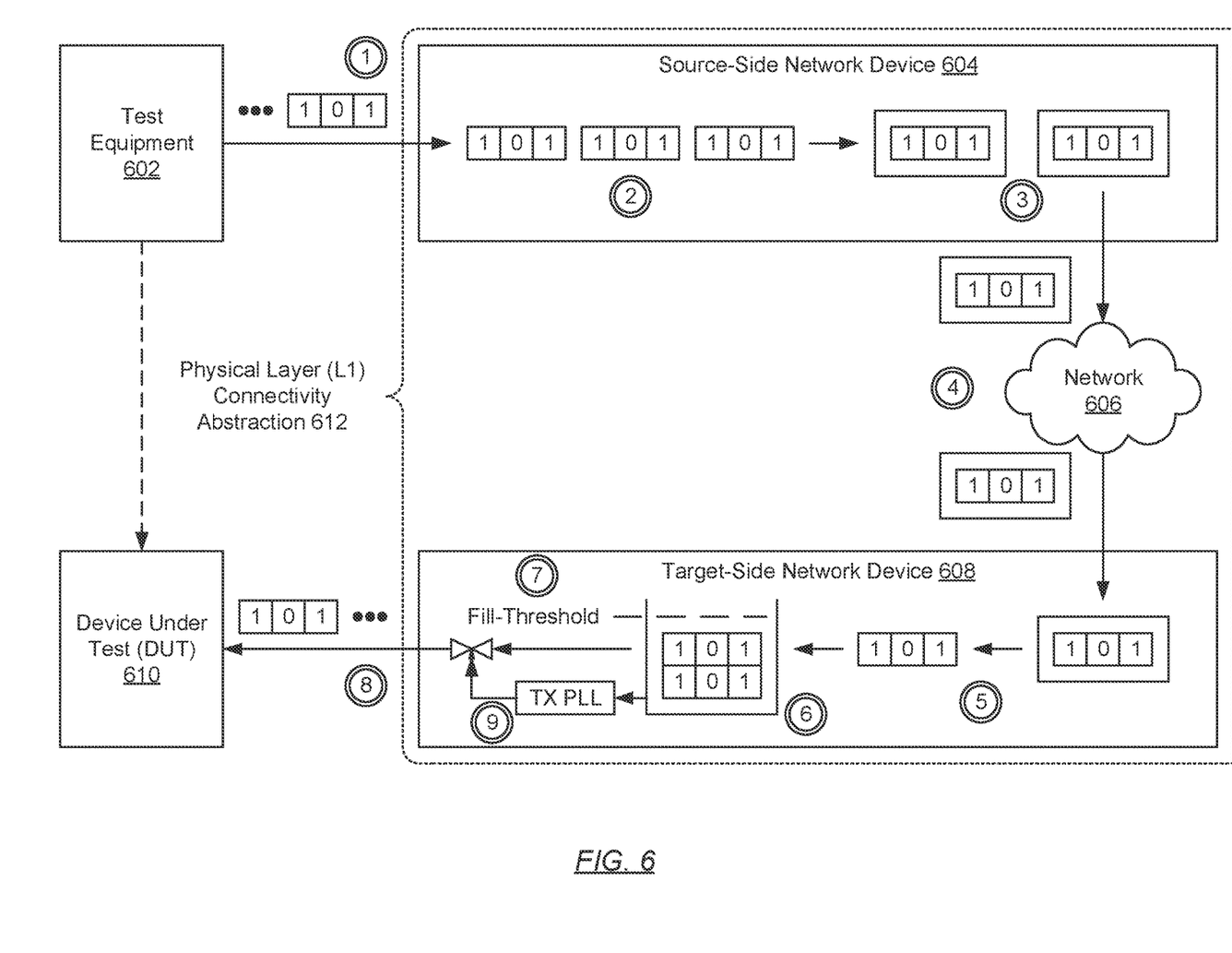
FIG. 6 shows an exemplary scenario in accordance with one or more embodiments of the disclosure.

FIG. 6 shows an exemplary scenario in accordance with one or more embodiments of the disclosure. The exemplary scenario, illustrated through FIG. 6 and described below, is for explanatory purposes only and not intended to limit the scope of the disclosure.

Turning to FIG. 6, consider a setup that includes test equipment (602), representative of a data source, and a device under test (DUT) (610) representative of a data target. The test equipment (602) (and the testing operations conducted thereby) is/are designed such that the DUT (610) should be co-located and directly connected. However, due to extenuating circumstances, the test equipment (602) and the DUT (610) are instead spatially or geographically apart. In order to emulate the necessary direct connection between the test equipment (602) and the DUT (610), a physical layer (or L1) connectivity abstraction (612) is implemented using a source-side network device (604), a network (606), and a target-side network device (608). Specifically, the test equipment (602) is co-located and directly connected to the source-side network device (604); the source-side network device (604) spatially/geographically distant and is operatively connected to the target-side network device (608) through the network (606); and the target-side network device (608) is co-located and directly connected to the DUT (610).

Using the above-described setup, a virtual L1 (or emulated direct) connection between the test equipment (602) and the DUT (610), via the network (606) and in accordance with one or more embodiments of the disclosure, may be implemented as follows:

1) The source-side network device (604) receives data (in analog form) from the test equipment (602) at a receive (RX) data rate;
2) The source-side network device (604) subsequently recovers an ingress clock associated, yet not accompanied with the data, and proceeds to convert the data (in analog form) into data (in digital form— e.g., a bit-stream), followed by segmenting the data (in digital form) into data chunks (in digital form—e.g., bit-stream chunks) based on the recovered ingress clock;
3) The source-side network device (604) thereafter packages or encapsulates the data chunks into one or more protocol data units (e.g., Ethernet frames);
4) The source-side network device (604) then transmits the protocol data unit(s) to the target-side network device (608) through the network (606);
5) The target-side network device (608) receives the protocol data unit(s) from the source-side network device (604) through the network (606), subsequently unpacking or decapsulating the protocol data unit(s) to obtain the data chunks therein;
6) The target-side network device (608) writes the data chunks into a transmit (TX) first-in, first-out (FIFO) buffer, and monitors a FIFO state thereof;
7) The target-side network device (608) determines that the FIFO state of the TX FIFO buffer has reached a predefined fill-threshold (e.g., half or 50% of a FIFO depth configured for the TX FIFO buffer), and accordingly, begins reading the data chunks from the TX FIFO buffer to reconstruct the data (in digital form) first, followed by the conversion thereof into data (in analog form);
8) The target-side network device (608) then transmits the reconstructed data (in analog form) to the DUT (610) at a TX data rate; and
9) The target-side network device (608) continues to monitor the FIFO state of the TX FIFO buffer, and accordingly, manipulates the TX data rate using a phase-lock loop (PLL) driven by the FIFO state, to match the TX data rate to the RX data rate (of the data received by the source-side network device (604)).

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A system for emulating physical layer (L1) connectivity over a network, the system comprising:
a source-side network device directly connected to a data source, and comprising:
a first computer processor; and
first memory comprising first computer readable program code, which when executed by the first computer processor, enables the first computer processor to perform a first method, the first method comprising:
receiving, through a first source-facing port, a bit-stream from the data source;
sampling the bit-stream to recover an ingress clock frequency associated with the bit-stream;
collecting a set of bit-stream chunks from the bit-stream based on the ingress clock frequency;
packaging the set of bit-stream chunks into at least one protocol data unit; and
transmitting, through a first target-facing port and over the network, the at least one protocol data unit to a target-side network device; and
the target-side network device operatively connected over the network to the source-side network device and directly connected to a data target, and comprising:
a second computer processor; and
second memory comprising second computer readable program code, which when executed by the second computer processor, enables the second computer processor to perform a second method, the second method comprising:

receiving, through a second source-facing port and over the network, the at least one protocol data unit from the source-side network device;

unpacking the at least one protocol data unit to obtain the set of bit-stream chunks;

writing the set of bit-stream chunks into a transmit (TX) first-in, first-out (FIFO) buffer; and based on a FIFO state of the TX FIFO buffer reaching a fill-threshold:

transmitting, through a second target-facing port and at a TX data rate adjusted based on the FIFO state, the bit-stream to the data target, wherein the bit-stream is reconstructed using the set of bit-stream chunks read from the TX FIFO buffer.

2. The system of claim 1, wherein the TX data rate decreases when the FIFO state lies below the fill-threshold and increases when the FIFO state exceeds the fill-threshold.

3. The system of claim 2, wherein the fill-threshold matches half of a FIFO depth configured for the TX FIFO buffer.

4. The system of claim 1, wherein the TX data rate matches a receive (RX) data rate of the bit-stream received by the source-side network device.

5. The system of claim 1, wherein an operative connection over the network between the target-side and source-side network devices implements an abstraction of the L1 connectivity between the data source and the data target.

6. The system of claim 1, wherein the target-side and source-side network devices are each from a set comprising a switch, a router, a multilayer switch, a fiber-channel device, or an InfiniBand device.

7. A method for emulating physical layer (L1) connectivity over a network, the method comprising:

receiving, by a target-side network device, at least one protocol data unit over the network from a source-side network device;

unpacking the at least one protocol data unit to obtain a set of bit-stream chunks;

writing the set of bit-stream chunks into a transmit (TX) first-in, first-out (FIFO) buffer; and based on a FIFO state of the TX FIFO buffer reaching a fill-threshold:

transmitting, at a TX data rate adjusted based on the FIFO state, a bit-stream to a data target directly connected to the target-side network device, wherein the bit-stream is reconstructed using the set of bit-stream chunks read from the TX FIFO buffer, and wherein the TX data rate matches a receive (RX) data rate of the bit-stream received by the source-side network device from a data source.

8. The method of claim 7, wherein the TX data rate decreases when the FIFO state lies below the fill-threshold and increases when the FIFO state exceeds the fill-threshold.

9. The method of claim 8, wherein the fill-threshold matches half of a FIFO depth configured for the TX FIFO buffer.

10. The method of claim 7, wherein an operative connection over the network between the target-side and source-side network devices implements an abstraction of the L1 connectivity between a data source and the data target.

11. The method of claim 10, wherein the data source and the data target are spatially or geographically distant from one another.

12. The method of claim 7, wherein the target-side network device is a switch, a router, a multilayer switch, a fiber-channel device, or an InfiniBand device.

13. A network device for, at least in part, emulating physical layer (L1) connectivity over a network, the network device comprising:

a plurality of ports;

a computer processor operatively connected to the plurality of ports; and memory comprising computer readable program code, which when executed by the computer processor, enables the computer processor to perform a method, the method comprising:

receiving, by a source-facing physical layer device in the network device, through a source-facing port of the plurality of ports, and over the network, at least one protocol data unit from a source-side network device;

unpacking the at least one protocol data unit to obtain a set of bit-stream chunks;

writing the set of bit-stream chunks into a transmit (TX) first-in, first-out (FIFO) buffer; and based on a FIFO state of the TX FIFO buffer reaching a fill-threshold:

transmitting, by a target-facing physical layer device in the network device, through a target-facing port of the plurality of ports, and at a TX data rate adjusted based on the FIFO state, a bit-stream to a data target, wherein the bit-stream is reconstructed using the set of bit-stream chunks read from the TX FIFO buffer.

14. The network device of claim 13, wherein the TX data rate decreases when the FIFO state lies below the fill-threshold and increases when the FIFO state exceeds the fill-threshold.

15. The network device of claim 14, wherein the fill-threshold matches half of a FIFO depth configured for the TX FIFO buffer.

16. The network device of claim 13, wherein the TX data rate matches a receive (RX) data rate of the bit-stream received by the source-side network device from a data source.

17. The network device of claim 13, wherein an operative connection over the network between the target-side and source-side network devices implements an abstraction of the L1 connectivity between a data source and the data target.

18. The network device of claim 17, wherein the data source and the data target are spatially or geographically distant from one another.

19. The network device of claim 13, wherein the network device is a switch, a router, a multilayer switch, a fiber-channel device, or an InfiniBand device.

* * * * *